United States Patent
Someno et al.

(10) Patent No.: US 7,177,519 B2
(45) Date of Patent: Feb. 13, 2007

(54) FUNCTIONAL MULTILAYER FILM AND METHOD FOR MANUFACTURING THE SAME

(75) Inventors: Yoshihiro Someno, Miyagi-ken (JP); Munemitsu Abe, Miyagi-ken (JP); Masayoshi Esashi, 1-11-9 Yagiyamaminami, Taihaku-ku, Sendai-shi, Miyagi-ken (JP)

(73) Assignees: Alps Electric Co., Ltd., Tokyo (JP); Masayoshi Esashi, Sendai (JP)

( * ) Notice: Subject to any disclaimer, the term of this patent is extended or adjusted under 35 U.S.C. 154(b) by 0 days.

(21) Appl. No.: 10/726,383

(22) Filed: Dec. 3, 2003

(65) Prior Publication Data

US 2004/0109990 A1   Jun. 10, 2004

(30) Foreign Application Priority Data

Dec. 9, 2002   (JP) ............................. 2002-356214

(51) Int. Cl.
  *G02B 6/00* (2006.01)
  *G02B 6/26* (2006.01)

(52) U.S. Cl. ..................... 385/137; 385/28; 385/30; 385/39; 385/49; 385/50; 385/63; 385/64; 385/71; 385/82

(58) Field of Classification Search ............ 385/48–51, 385/28, 30, 63–64, 71, 82, 137
See application file for complete search history.

(56) References Cited

U.S. PATENT DOCUMENTS

| | | | | |
|---|---|---|---|---|
| 3,864,018 A | * | 2/1975 | Miller | ......................... 385/98 |
| 4,046,454 A | * | 9/1977 | Pugh, III | ...................... 385/59 |
| 4,943,136 A | * | 7/1990 | Popoff | ......................... 385/46 |
| 5,526,454 A | * | 6/1996 | Mayer | ......................... 385/49 |
| 5,528,719 A | * | 6/1996 | Yamada | ...................... 385/137 |
| 5,889,914 A | * | 3/1999 | Gentsu | ....................... 385/137 |
| 5,906,670 A | | 5/1999 | Dobson et al. | |
| 5,949,932 A | * | 9/1999 | Lawrenz-Stolz | ............. 385/33 |
| 6,324,323 B1 | * | 11/2001 | Benham et al. | ............... 385/49 |
| 6,377,732 B1 | * | 4/2002 | Li et al. | ........................ 385/49 |
| 6,549,713 B1 | * | 4/2003 | Pi et al. | ...................... 385/137 |
| 6,621,951 B1 | * | 9/2003 | Zhao et al. | ................... 385/30 |
| 6,681,496 B2 | * | 1/2004 | Law et al. | .................... 33/645 |
| 6,690,857 B2 | * | 2/2004 | Zhao et al. | ................... 385/30 |

* cited by examiner

*Primary Examiner*—Cathy F. Lam
(74) *Attorney, Agent, or Firm*—Brinks, Hofer, Gilson & Lione

(57) ABSTRACT

A functional multilayer film and a method for manufacturing the same is provided in which the intervals of fine metallic bodies in the thickness direction and the arrangement thereof in the surface direction are regular, and the fine metallic bodies arranged on each layer are aligned in the thickness direction.

A functional multilayer film is obtained by fixing a plurality of fine metallic bodies to a matrix made of a dielectric substance. The matrix is obtained by laminating metal-arranged thin films, which each contain a dielectric thin film having a predetermined thickness and the fine metallic bodies arranged on the dielectric thin film. A plurality of recesses is regularly formed on the surface of the dielectric thin film, and the fine metallic bodies are arranged in the lower parts of the recesses.

24 Claims, 4 Drawing Sheets

FUNCTIONAL MULTILAYER FILM AND METHOD FOR MANUFACTURING THE SAME

This application claims the benefit of priority to Japanese Patent Application No. 2002-356214, herein incorporated by reference.

BACKGROUND OF THE INVENTION

Field of the Invention

This invention relates to a functional multilayer film having fine metallic bodies dispersed in a dielectric substance, and more specifically, to a functional multilayer film in which the size of metal bodies is made substantially uniform and the fine metallic bodies are arranged regularly in the thickness direction and the surface direction.

Conventionally, an optical material fixed by dispersing fine metallic bodies in a dielectric substance is used as the optical material showing a nonlinear optical effect. It is possible for such an optical material to vary the reflection or diffraction of incident light by providing potential difference, otherwise oppositely to vary the electric field in the substance by making light incident thereon. Using such characteristics, the optical material showing the nonlinear optical effect can be used in the optical communication field, or all of optical calculating elements, etc.

The characteristics of the optical material vary depending on the size or arrangement of fine metallic bodies dispersed in a matrix made of a dielectric substance. Accordingly, in order to manufacture an optical material having a desired function, the fine metallic bodies must have a predetermined size or be arranged in a predetermined pattern. Preferably, fine metallic bodies in a dielectric matrix have the same size, as much as possible, and the particles thereof are dispersed in uniform density. Moreover, the fine metallic bodies can have a desired characteristic by having a specific arrangement.

The optical material showing such a nonlinear optical effect, as disclosed in U.S. Pat. No. 5,906,670, is manufactured by making metallic fine particles included in a solution containing polymer, etc., removing a volatile solvent from the solution, and forming a dielectric matrix in which metallic fine particles are enclosed. In this case, the metallic fine particles are randomly dispersed in the dielectric matrix.

However, the conventional optical material showing the nonlinear optical effect had the following problems.

In case that the metallic fine particles are randomly dispersed in a dielectric substance, it is impossible to arrange the metallic fine particles regularly, and a partial irregularity in the density of the metallic fine particles occurs easily. Moreover, since metallic fine particles are diffused into a dielectric substance, the particles may become large and the size of particles may become unstable due to a granulation effect in case that the dispersion density of the fine metallic particles is large. It was impossible to obtain an excellent nonlinear property with the conventional optical material due to the irregularity in the distribution of the particles or unstableness in the size of the particles, as described above.

Thus, a functional multilayer film has been proposed wherein dielectric thin films are laminated to form a matrix, and a number of fine metallic bodies are arbitrarily arranged on a surface of each of the dielectric thin films thereby to form a metal pattern.

According to this functional multilayer film, it is possible to arrange fine metallic bodies at a predetermined interval. This enables the local unevenness of the fine metallic bodies in the matrix to be suppressed.

However, according to this functional multilayer film, the intervals of the fine metallic bodies in the thickness direction of the film and the arrangement thereof in the surface direction of film can be regular, but it is difficult to make the fine metallic bodies arranged in each layer in the surface direction of the film to be aligned also in the thickness direction of film. In other words, as can be also found from FIG. 7, it is difficult to arrange fine metallic bodies of a dielectric thin film directly on fine metallic bodies of a dielectric thin film. As a result, the fine metallic bodies are not arranged in line with respect to the thickness direction of the film.

SUMMARY OF THE INVENTION

The present invention was made to solve the above problems. Embodiments of the present invention provide a functional multilayer film and a method for manufacturing the same wherein the intervals of the fine metallic bodies in the thickness direction of the film and the arrangement thereof in the surface direction of the film are regular, and the fine metallic bodies arranged in each layer in the surface direction of the film are aligned in the thickness direction of the film.

In order to solve the above problems, a functional multilayer film according to the present invention is obtained by fixing a plurality of fine metallic bodies to a matrix made of a dielectric substance, the matrix is obtained by laminating metal-arranged thin films, each metal-arranged thin film comprising a dielectric thin film having a predetermined thickness and the fine metallic bodies arranged in the dielectric thin film, and a plurality of recesses is regularly formed on the surface of the dielectric thin film, and the fine metallic bodies are arranged in the lower parts of the recesses.

According to the present invention, the intervals of the fine metallic bodies in the thickness direction of the film and the arrangement thereof in the surface direction of the film can be regular, and the fine metallic bodies arranged in each layer in the surface direction of the film can be aligned in the thickness direction of the film.

Further, in the functional multilayer film according to the present invention, the dielectric thin films and the fine metallic bodies are made of different materials in every metal-arranged thin film or in every region including a plurality of the metal-arranged thin films.

According to the present invention, by making the dielectric thin films or the fine metallic bodies to be made of different materials each other, it is possible to give one functional multilayer film a complex functional effect.

Further, a method for manufacturing a functional multilayer film according to the present invention comprises the steps of: forming a dielectric thin film so as to have a plurality of recesses regularly arranged on the surface thereof, forming a metal-arranged thin film by forming a metallic thin film on the dielectric thin film, and performing a heat treatment to the metallic thin film so as to flow metal into the lower parts of the dielectric thin films to form fine metallic bodies, and forming a matrix by laminating a plurality of the metal-arranged thin films, each comprising the dielectric thin film and the minute metallic bodies.

According to the present invention, it is possible to manufacture a functional multilayer film wherein the intervals of the fine metallic bodies in the thickness direction of the film and the arrangement thereof in the surface direction

DESCRIPTION OF THE PREFERRED EMBODIMENTS

Figure 1:
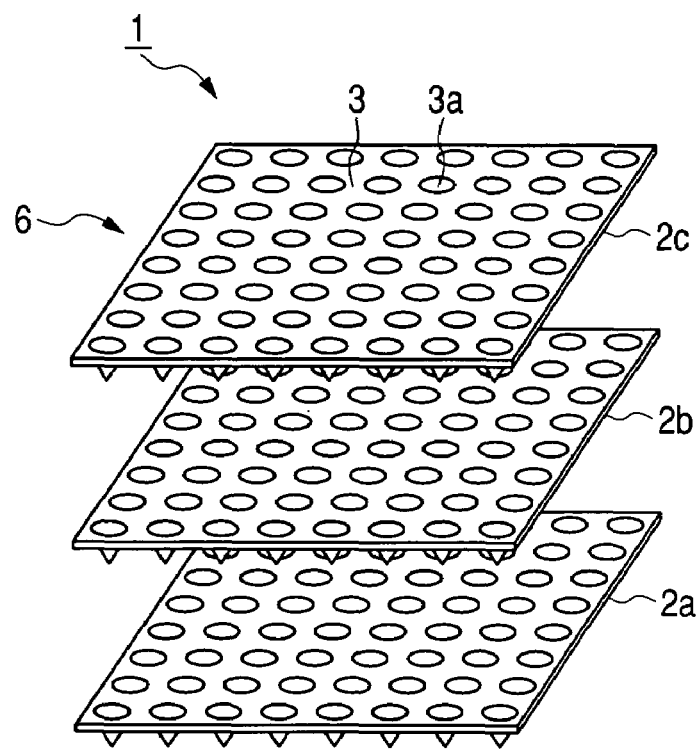
FIG. 1 is a perspective view schematically illustrating a functional multilayer film according to a first embodiment.

Preferred embodiments of the present invention will be explained in detail with reference to the accompanying drawings. First, a first embodiment will be explained. FIG. 1 is a perspective view schematically illustrating a functional multilayer film according to the first embodiment. Also, FIG. 2 is a schematic cross-sectional view of the functional multilayer film according to the first embodiment.

The functional multilayer film according to this embodiment comprises a matrix 1 obtained by forming a dielectric thin films 2 made of a dielectric substance on a substrate 9, arranging a number of fine metallic bodies 4 on each of the dielectric thin films 2 so as to form a metal-arranged thin films 6, and laminating a plurality of the metal-arranged thin films 6. $SiO_2$, etc may be used as a material of the dielectric thin films 2. Further, Au, etc., may be used as a material of the fine metallic bodies 4.

Figure 2:
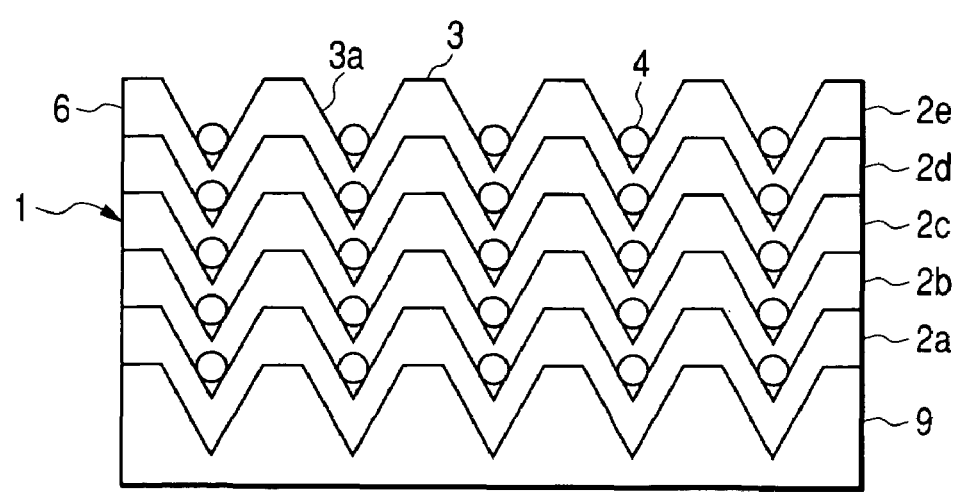
FIG. 2 is a schematic cross-sectional view of the functional multilayer film according to the first embodiment.

FIG. 2 is a cross-sectional view of the matrix 1 formed as described above. As shown in FIG. 2, each of the dielectric thin films 2 has a plurality of conical recesses 3a having the same shape which is regularly arranged on a surface 3 thereof, and has substantially spherical fine metallic bodies 4 arranged in the lower parts of the conical recesses 3a so as to form a metal-arranged thin film 6. Although the fine metallic bodies 4 are formed in a substantially spherical shape herein, the shape of the fine metallic bodies 4 is not limited thereto.

By laminating a plurality of the metal-arranged thin films 6, each comprising a dielectric thin film and the fine metallic bodies 4, a matrix 1 is formed. The number of dielectric thin films 2 is five (i.e. dielectric thin films 2a to 2e) herein, and the respective dielectric thin films 2a to 2e are formed to have the substantially same thickness. However, the number of the dielectric thin films 2 to be laminated is not limited thereto.

Further, conical recesses 3a of the dielectric thin film 2b are formed in the same shape on conical recesses 3a of the dielectric thin film 2a. Similarly, conical recesses 3a of an overlying dielectric thin film 2c are formed in the same shape on conical recesses 3a of an underlying dielectric thin film 2b.

As described above, by arranging substantially spherical fine metallic bodies 4 in the lower parts of a plurality of the conical recesses 3a which is regularly arranged on the surface 3 of each of the dielectric thin films so as to form the metal-arranged thin film 6, and laminating a plurality of the metal-arranged thin films 6, it is possible to arrange the fine metallic bodies 4 at the substantially same intervals in the thickness direction of the film and in the surface direction of the film. As a result, it is possible to suppress a partial irregularity in the thickness direction of the film and in the surface direction of the film compared with a case in which metallic fine particles are randomly arranged in a dielectric matrix.

Moreover, by forming conical recesses 3a of an overlying dielectric thin film 2b in the same shape on conical recesses 3a of an underlying dielectric thin film 2a, the fine metallic bodies 4 arranged in the lower parts of the conical recesses 3a are aligned in the direction of the film thickness.

Furthermore, although the recesses 3a are formed in a conical shape herein, the shape of the recesses 3a is not limited thereto, but may be formed, for example, in a quadrangular pyramidal shape or a triangular pyramidal shape. Further, the recesses are not limited to the conical shape, but may be formed in a cylindrical shape, semispherical shape, or a square shape.

Figure 3A:
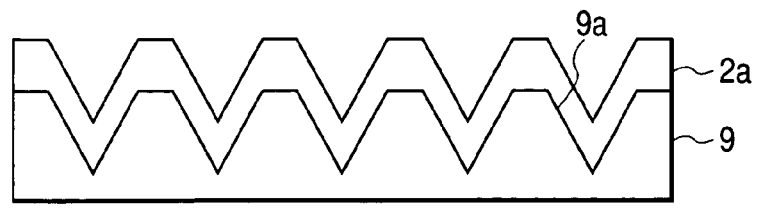
FIG. 3 is a schematic cross-sectional view illustrating manufacturing processes of a functional multilayer film.
Figure 3B:
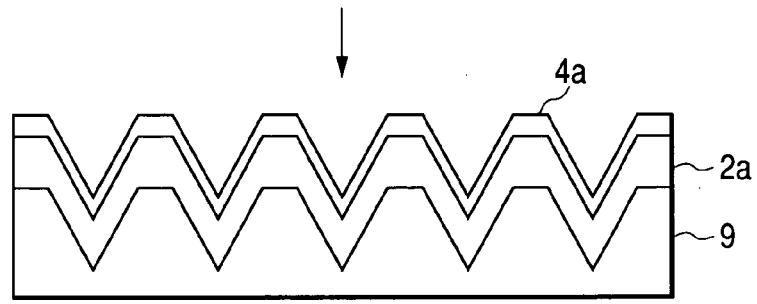

Next, a method for manufacturing such a functional multilayer film will be described. FIG. 3 is a schematic cross-sectional view illustrating manufacturing processes of a functional multilayer film. First, a substrate 9 having a plurality of conical recesses 9a of the same shape regularly arranged is prepared. The substrate 9 can be formed by performing an etching process to a thin plate made of Si. The dielectric thin film 2a is formed to have a predetermined thickness on the substrate 9 (FIG. 3A). By forming the dielectric thin film 2a on the substrate 9 so as to have the conical recesses 9a in this manner, it is possible to form a plurality of conical recesses 3a of the same shape regularly arranged on the surface 3 of the dielectric thin film 2a.

Figure 3C:
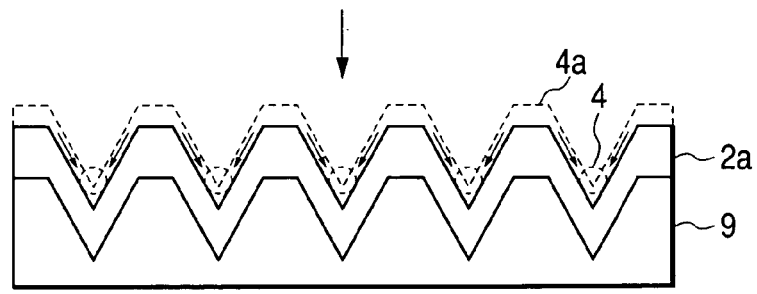
Figure 3D:
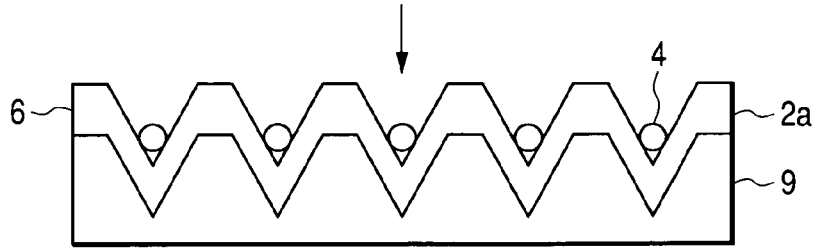
Figure 3E:
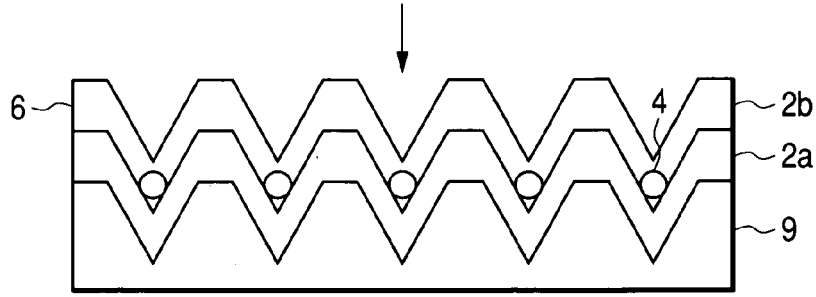

Next, a metallic thin film 4a is formed on the dielectric thin film 2a (FIG. 3B), and the metallic thin film 4a is subjected to a heat treatment after forming the film (FIG. 3C). When heat is applied to the metallic thin film 4a, a metal constituting the metallic thin film 4a is melted to have fluidity, and then is collected in the lower parts of the conical recesses 3a along an oblique plane of each of the conical recesses 3a. Then, by further applying heat to the melt, it aggregates and forms substantially spherical, fine metallic bodies 4 (FIG. 3D). The fine metallic bodies 4 are arranged in the lower parts of the respective conical recesses 3a in this manner, consequently, a metal-arranged thin film 6 is formed.

Then, by repeatedly performing a process in which the dielectric thin film 2b is further formed to have a predetermined thickness on the metal-arranged thin film 6 (FIG. 3E), and a metallic thin film 4a is formed so as to form fine metallic bodies 4, a matrix 1 having a plurality of the metal-arranged thin films 6 laminated therein is formed. In this manner, by forming a further overlying dielectric thin film 2a on the dielectric thin film 2 having the conical recesses 3a, it is possible to form conical recesses 3a of an overlying dielectric thin film 2a on conical recesses 3a of an underlying dielectric thin film 2a thereof.

Moreover, the film can be formed by using a sputtering method, a chemical deposition method (CVD), etc.

Although the fine metallic bodies 4 are aggregated to form a substantially spherical shape in this embodiment, a heat treatment may be completed prior to the aggregation so as to form the fine metallic bodies 4 in the same shape as the bottoms of the conical recesses 3a.

Furthermore, by forming the conical recesses 3a in the form of recesses having an elliptical section, forming the fine metallic bodies 4 in the same shape as the conical recesses 3a, and providing the shape of the fine metallic bodies 4 with directionality, the fine metallic bodies 4 may have an anisotropic property with respect to a polarized direction.

Figure 4:
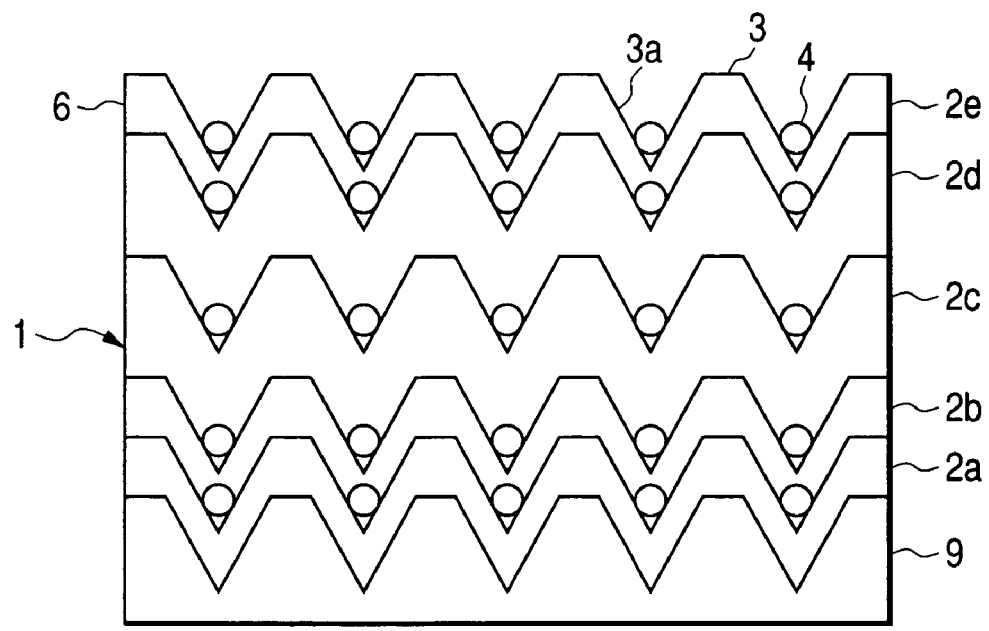
FIG. 4 is a schematic cross-sectional view of a functional multilayer film according to a second embodiment.

Next, a second embodiment will be explained. FIG. 4 is a schematic cross-sectional view of a functional multilayer film according to this embodiment. The functional multilayer film of this embodiment has a plurality of conical recesses 3a with the same shape which is regularly arranged on a surface 3 of a dielectric thin film 2, and is configured by laminating metal-arranged thin films 6, which are respectively obtained by arranging a plurality of substantially spherical fine metallic bodies 4 in the lower parts of the conical recesses 3a. In the first embodiment, the fine metallic bodies 4 are arranged at substantially regular intervals in the thickness direction of film. However, the fine metallic bodies does not need to be arranged at regular intervals, and the dielectric thin film 2 can be formed such that the fine metallic bodies are arranged at arbitrary intervals.

As shown in FIG. 4, in this embodiment, the film thicknesses of the dielectric thin films 2 are not regular, but the dielectric thin films are formed so as to have an arbitrary thickness, respectively. That is, in FIG. 4, dielectric thin films 2c and 2d are made thicker than the other dielectric thin films 2a, 2b, and 2e. The second embodiment is similar to the first embodiment in that the dielectric thin film 2 has a plurality of conical recesses 3a with the same shape which is regularly arranged on the surface 3, and substantially spherical fine metallic bodies 4 are formed in the lower parts of the conical recesses 3a. By laminating the dielectric thin films 2 whose thickness are different from each other, as mentioned above, the fine metallic bodies 4 have an arrangement pattern in the thickness direction of film. Accordingly, the functional multilayer film enables a desired nonlinear optical effect to be obtained.

Figure 5:
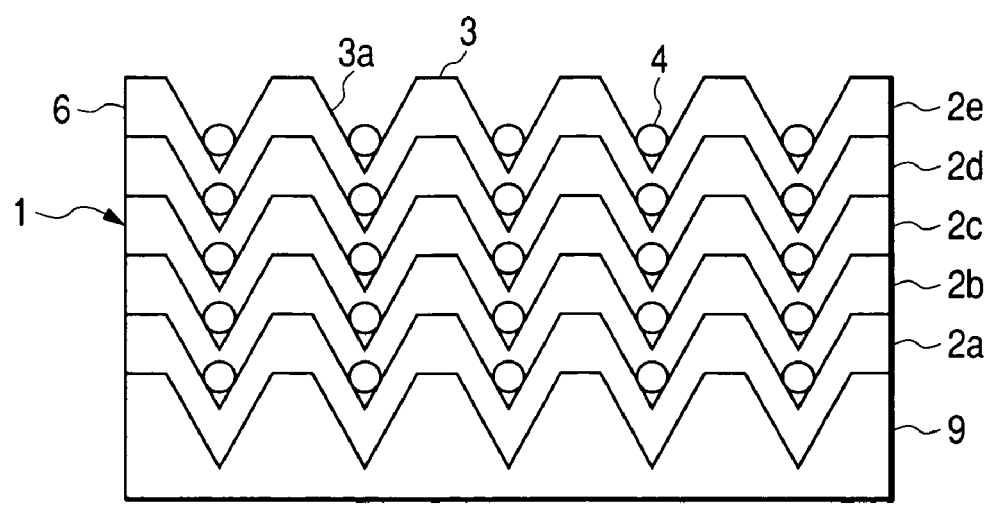
FIG. 5 is a schematic cross-sectional view of a functional multilayer film according to a third embodiment.

Next, a third embodiment will be explained. FIG. 5 is a schematic cross-sectional view of a functional multilayer film according to this embodiment. The functional multilayer film of the embodiment has a plurality of conical recesses 3a with the same shape which is regularly arranged on a surface 3 of a dielectric thin film 2, and is configured by laminating metal-arranged thin films 6 obtained by arranging a plurality of substantially spherical fine metallic bodies 4 in the lower parts of the conical recesses 3a. As a result, it is possible to make the materials of the dielectric thin films 2 or the materials of the fine metallic bodies 4 to be different for every metal-arranged thin film 6.

In this embodiment, dielectric thin films 2c and 2d and the other dielectric thin films 2a, 2b, and 2e are made of different materials. Further, fine metallic bodies 4 arranged on the dielectric thin films 2c and 2d and fine metallic bodies 4 arranged on the dielectric thin films 2a, 2b, and, 2e are made of different materials. By making the materials of dielectric thin films 2 or fine metallic bodies 4 of the metal-arranged thin film 6 to be different from each other, one functional multilayer film may have a complex function.

Figure 6:
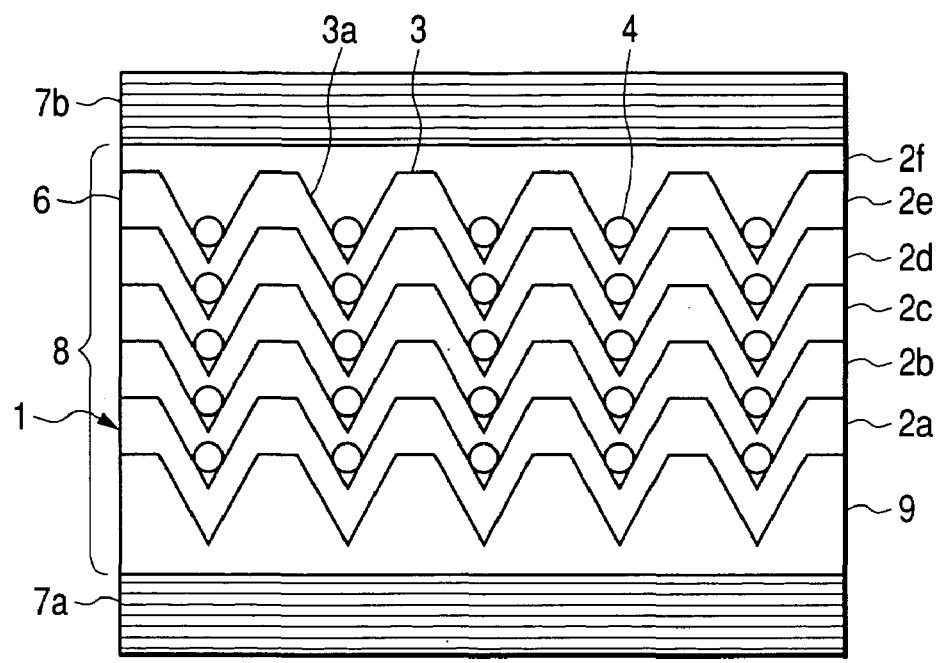
FIG. 6 is a schematic cross-sectional view of a functional multilayer film according to a fourth embodiment.
Figure 7:
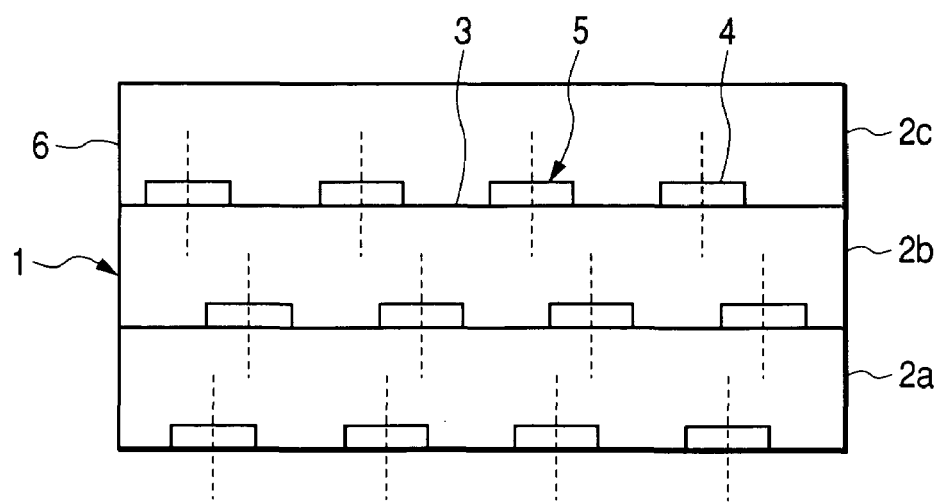
FIG. 7 is a schematic cross-sectional view of a functional multilayer film proposed by the present inventors.

Next, a fourth embodiment will be explained. FIG. 6 is a schematic cross-sectional view of a functional multilayer film according to this embodiment. In this embodiment, it is configured such that multilayer film filters 7a and 7b are provided at the end of the matrix 1 in the thickness direction of film. That is, a functional multilayer film region 8, which is obtained by laminating dielectric thin films 2 and a substrate 9, is interposed between the multilayer film filters 7a and 7b. The multilayer film filters 7a and 7b function as a so-called narrow bandwidth reflection filter, which transmits only a light component with a specific wavelength. This configuration enables a light component with a specific wavelength to travel back and forth through the functional multilayer film region 8 several times by a reflection mirror effect of the multilayer film filters 7a and 7b. This enables a nonlinear optical effect on the incident light to be controlled. Moreover, although it is configured herein such that the functional multilayer film region 8 is interposed between the multilayer film filters 7a and 7b, the functional multilayer films 2 may have a functional multilayer filter therebetween.

Since the reflection or transmission of light can be controlled by means of the electric field in the functional multilayer film region 8, it is possible to control the nonlinear optical effect by providing an electrode (not shown) in the functional multilayer film region 8 and thereby repeating the reflection of a light component with a specific wavelength several time as described above. Further, by making light incident on the functional multilayer film region 8, the electric field in this region varies. Accordingly, when a light component with a specific wavelength of light to be transmitted exists in the functional multilayer film region 8, another controlled light component is entered to the region to vary a state of electric field, and thus it is possible to reflect the specific wavelength of light in the region. This enable an optical switch controlled by light to be configured.

According to the present invention as described above, fine metallic bodies are arranged in the lower parts of a plurality of recesses which is regularly arranged on a surface of a dielectric thin film so as to form a metal-arranged thin film, and a plurality of the metal-arranged thin films are laminated. Thus, the intervals of the fine metallic bodies in the thickness direction of the film and the arrangement thereof in the surface direction of the film become regular. As a result, it is possible to suppress a partial irregularity in the fine metallic bodies in the thickness direction and surface direction of the film. Moreover, it is possible to make the fine metallic bodies arranged in the lower parts of the recesses of each layer in the surface direction of film to be aligned in the thickness direction of the film. This enables a functional multilayer film having an excellent nonlinear property to be obtained. Further, it is also possible to arbitrarily control an interaction between layers of the fine metallic bodies aligned in the thickness direction of the film.

Further, according to the present invention, the dielectric thin films and the fine metallic bodies are made of different materials in every metal-arranged thin film or in every region including a plurality of the metal-arranged thin films. As a result, one functional multilayer film may have a complex functional effect.

Further, according to the present invention, a dielectric thin film is formed to have a plurality of recesses regularly arranged on the surface thereof, a metallic thin film is formed on the dielectric thin film, a heat treatment is performed to the metallic thin film for metal to flow into the lower parts of the recesses of the dielectric thin film so as to form fine metallic bodies to complete a metal-arranged thin film, and a plurality of the metal-arranged thin films is laminated to form a matrix. As a result, it is possible to manufacture a functional multilayer film in which the intervals of the fine metallic bodies in the thickness direction of the film and the arrangement thereof in the surface direction of the film are regular, and the fine metallic bodies arranged on each layer in the surface direction of film are aligned in the thickness direction of the film.

What is claimed is:

1. A functional multilayer film comprising a matrix comprising laminated metal-arranged thin films, each metal-arranged thin film comprising a dielectric thin film having a predetermined thickness and a plurality of fine metallic bodies arranged on the dielectric thin film, wherein a plurality of recesses is regularly formed on a surface of each dielectric thin film and the fine metallic bodies are arranged in lower parts of the recesses,
wherein the plurality of fine metallic bodies is made of a different material from one another in at least one of the metal-arranged thin films.

2. A functional multilayer film according to claim 1, wherein the dielectric thin film in at least one metal-arranged thin film is made of a different material from the dielectric thin film in at least one other metal-arranged thin film.

3. A functional multilayer film according to claim 1, wherein at least one of the dielectric thin films or the plurality of fine metallic bodies is made of different materials from other dielectric thin films and other plurality of fine metallic bodies, respectively, in said laminated metal-arranged thin films.

4. A functional multilayer film according to claim 1, wherein, in a region including a plurality of the metal-arranged thin films, the metal-arranged thin films comprising a plurality of dielectric thin films and more than one plurality of fine metallic bodies, at least one of the plurality of dielectric thin films or the more than one plurality of fine metallic bodies is made of a different material in the region from another plurality of dielectric thin films and another plurality of fine metallic bodies, respectively, in the region.

5. A functional multilayer film according to claim 1, wherein the plurality of fine metallic bodies is made of a different material from one another in each metal-arranged thin film.

6. A functional multilayer film according to claim 1 wherein, in a region including a plurality of the metal-arranged thin films, the metal-arranged thin films comprising a plurality of dielectric films, the plurality of dielectric films is made of a different material from one another in the region.

7. A functional multilayer film according to claim 1, wherein, in a region including a plurality of the metal-arranged thin films, the metal-arranged thin films comprising more than one plurality of fine metallic bodies, the more than one plurality of fine metallic bodies is made of a different material from one another in the region.

8. The functional multilayer film according to claim 1, wherein a first multilayer filter is disposed on a top surface of the matrix, and a second multilayer filter is disposed on a bottom surface of the matrix.

9. The functional multilayer film according to claim 8, wherein the first and the second multilayer filters are narrow bandwidth reflection filters.

10. The functional multilayer film according to claim 1, wherein the fine metallic bodies arranged in a surface direction of a first layer of the functional multilayer film are aligned with the fine metallic bodies arranged in a surface direction of a second layer of the functional multilayer film in a direction orthogonal to a surface of the first layer.

11. The functional multilayer film according to claim 1, wherein each of the fine metallic bodies is formed in an elliptical shape as elliptically-shaped fine metallic bodies.

12. A functional multilayer film, comprising:
metal-arranged thin films,
wherein the metal-arranged thin films are fabricated by a process comprising:
forming a plurality of recesses arranged on a surface of a dielectric thin film;
forming a metallic thin film on the dielectric thin film, and performing a heat treatment on the metallic thin film such that metal of the metallic thin film flows into lower parts of the recesses of the dielectric thin film to form fine metallic bodies; and
laminating a plurality of the metal-arranged thin films, each metal-arranged thin film comprising the dielectric thin film and the fine metallic bodies, the fine metallic bodies made of a different material from one another in at least one of the metal-arranged thin films.

13. The functional multilayer film according to claim 12, wherein the dielectric thin film comprising a first dielectric film and a second dielectric film and a thickness of the first dielectric film and a thickness of the second dielectric film are the same.

14. The functional multilayer film according to claim 12, wherein the recess shape is at least one of conical, ellipsoidal, quadrangular pyramidal, triangular pyramidal, cylindrical, semispherical, or square.

15. The functional multilayer film according to claim 14, wherein a distance between adjacent fine metallic bodies in the lamination direction is the same and a distance between adjacent fine metallic bodies in the surface direction is the same.

16. The functional multilayer film according to claim 12, wherein the recesses of a first dielectric thin film are formed by deposition of the dielectric thin film on a substrate having recesses.

17. A functional multilayer film comprising a matrix comprising laminated metal-arranged thin films, each metal-arranged thin film comprising a dielectric thin film having a predetermined thickness and a plurality of fine metallic bodies arranged on the dielectric thin film, wherein a plurality of recesses is regularly formed on a surface of each dielectric thin film and the fine metallic bodies are arranged in lower parts of the recesses,
wherein the plurality of fine metallic bodies is made of a different material from one another in at least one of the metal-arranged thin films,
wherein a first multilayer filter is disposed on a top surface of the matrix, and a second multilayer filter is disposed on a bottom surface of the matrix, and
wherein the first and the second multilayer filters are narrow bandwidth reflection filters.

18. A functional multilayer film comprising a matrix comprising laminated metal-arranged thin films, each metal-arranged thin film comprising a dielectric thin film having a predetermined thickness and a plurality of fine metallic bodies arranged on the dielectric thin film, wherein a plurality of recesses is regularly formed on a surface of each dielectric thin film and the fine metallic bodies are arranged in lower parts of the recesses, wherein each of the fine metallic bodies is formed in an elliptical shape.

19. A functional multilayer film according to claim 18, wherein the plurality of fine metallic bodies is made of a different material from one another.

20. A functional multilayer film according to claim 18, wherein the dielectric films are made of different materials from one another in a region including a plurality of the metal-arranged thin films.

21. A functional multilayer film according to claim 18, wherein the pluralities of fine metallic bodies are made of different materials from one another in a region including a plurality of the metal-arranged thin films.

22. The functional multilayer film according to claim 18, wherein a first multilayer filter is disposed on a top surface to the matrix, and a second multilayer filter is disposed on a bottom surface of the matrix.

23. The functional multilayer film according to claim 22, wherein the first and the second multilayer filters are narrow bandwidth reflection filters.

24. A functional multilayer film comprising a matrix comprising laminated metal-arranged thin films, each metal-arranged thin film comprising a dielectric thin film having a predetermined thickness and a plurality of fine metallic bodies arranged on the dielectric thin film, wherein a plurality of recesses is regularly formed on a surface of each dielectric thin film and the fine metallic bodies are arranged in lower parts of the recesses, wherein the fine metallic bodies are each formed in an elliptical shape, wherein the fine metallic bodies in at least one metal-arranged thin film are made of a different material from the fine metallic bodies in at least one other metal-arranged thin film, wherein a first multilayer filter is disposed on a top surface of the matrix, and a second multilayer filter is disposed on a bottom surface of the matrix, and wherein the first and the second multilayer filters are narrow bandwidth reflection filters.

* * * * *

UNITED STATES PATENT AND TRADEMARK OFFICE
CERTIFICATE OF CORRECTION

| | | |
|---|---|---|
| PATENT NO. | : 7,177,519 B2 | Page 1 of 1 |
| APPLICATION NO. | : 10/726383 | |
| DATED | : February 13, 2007 | |
| INVENTOR(S) | : Yoshihiro Someno et al. | |

It is certified that error appears in the above-identified patent and that said Letters Patent is hereby corrected as shown below:

<u>In the Claims</u>

Column 9, in claim 22, line 3, before "the matrix, and a second multilayer" delete "to" and substitute --of-- in its place.

Signed and Sealed this

Fourth Day of March, 2008

JON W. DUDAS
*Director of the United States Patent and Trademark Office*